T. G. STOUGH.
KALEIDOSCOPE.
APPLICATION FILED DEC. 23, 1912.
1,078,008.
Patented Nov. 11, 1913.
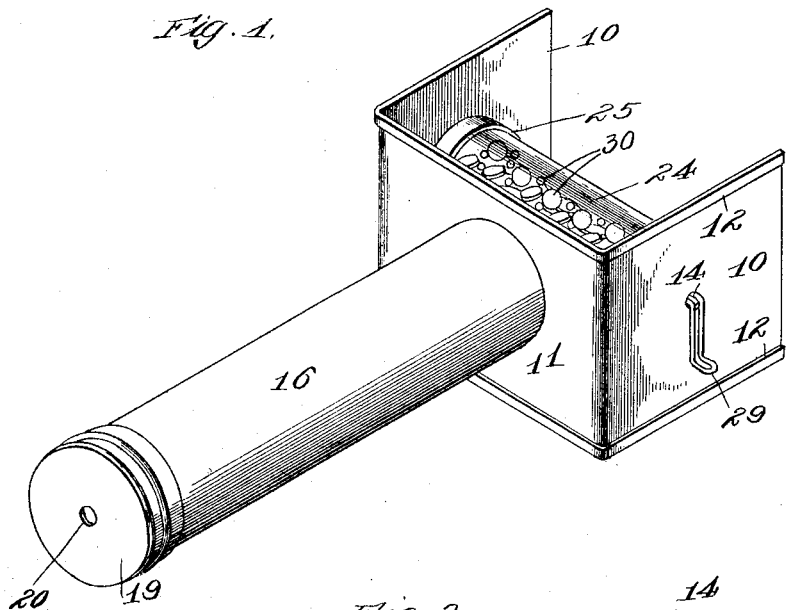
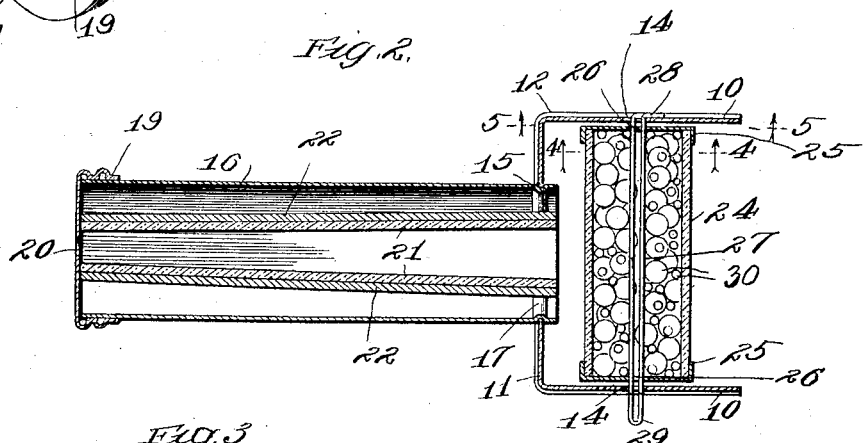
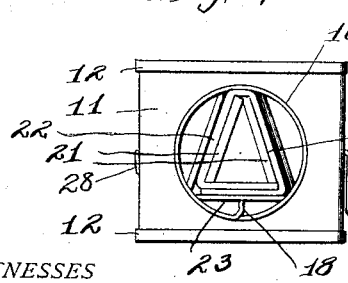
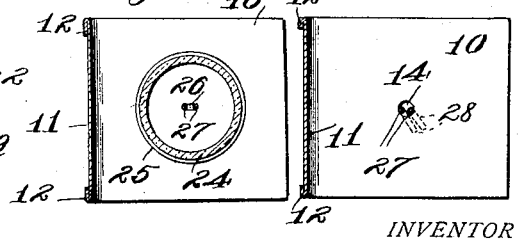
WITNESSES
INVENTOR
Turney G. Stough,
By A. M. Wilson Attorney

UNITED STATES PATENT OFFICE.

TURNEY G. STOUGH, OF JEANNETTE, PENNSYLVANIA.

KALEIDOSCOPE.

1,078,008. Specification of Letters Patent. Patented Nov. 11, 1913.

Application filed December 23, 1912. Serial No. 738,221.

*To all whom it may concern:*

Be it known that I, TURNEY G. STOUGH, a citizen of the United States, and residing at Jeannette, in the county of Westmoreland and State of Pennsylvania, have invented certain new and useful Improvements in Kaleidoscopes, of which the following is a specification.

This invention relates to certain new and useful improvements in kaleidoscopes, and has for one of its objects to provide an optical instrument wherein various prismatic effects may be obtained with constantly changing figures or productions of sculptural and designing architectural art in shapes and sizes or outlines varying at the will of the observer.

A further object of the invention is to produce a device of this character educational in its nature as well as amusing to the observer.

A still further object is to provide a device of this character with a novel form of object-bodies, and a device extremely cheap and simple to manufacture, yet which will be strong and durable in construction, and effective for the purpose intended.

With the above and other objects in view, the invention resides in the novel construction, combination, and arrangement of parts to be hereinafter more specifically described and then claimed, and in describing the invention in detail, reference will be had to the accompanying drawings forming a part of this specification, and wherein like numerals of reference will be employed for indicating like parts throughout the different views of the drawings, in which:—

Figure 1 is a view in perspective of a kaleidoscope constructed in accordance with my invention. Fig. 2 is a central longitudinal sectional view of the same. Fig. 3 is an end view of the kaleidoscope with the end cap of the observation tube removed. Fig. 4 is a cross-sectional view of the object holder taken on line 4—4 of Fig. 2, the view being for the purpose of clearly illustrating the form of the opening provided in each of the end caps of the object holder, and, Fig. 5 is a view taken on line 5—5 of Fig. 2, the view illustrating the form of opening that is provided in each of the supporting walls of the object holder frame.

The device, briefly and broadly stated, embodies a frame, of somewhat U-shape, or in other words, three sided; two of the sides or walls of this frame have a cylindrical object holder revolubly-mounted between them, while in the remaining side or wall, an observation tube is revolubly-mounted and this tube carries two reflecting glasses or mirrors which revolve with the tube.

A construction embodying the above will now be specifically described, it being understood that in the practice of the invention, various changes may be made in details of construction without departing from the spirit of the invention or the scope thereof as claimed.

In the drawings, 10 indicates the sides or side walls of a supporting frame, these sides being spaced apart and connected at one end by a wall 11, thus forming a U-shaped or three-sided frame. In practice, this frame is preferably formed from thin sheet metal in one piece, the edges of which may be beaded over as shown at 12 to reinforce the frame and which beading also eliminates any sharp or raw edges on the frame.

Centrally of the sides 10, the same are provided with circular apertures 14, while the connecting wall 11 is provided with a large circular aperture 15. The frame as thus constructed may be readily stamped from a sheet of material, making it extremely simple and cheap to manufacture.

An observation tube 16 is mounted in the aperture 15 in which it is revoluble, and in which it is held by the inherent tendency of the tube 16, due to the specific construction of such tube, to expand. This tube is formed from a sheet of thin metal similar to that used for making the above described frame, such sheet being rolled into tubular form and provided near its inner end with a peripheral groove 17 in which the circular wall of the aperture 15 is received as clearly seen in Fig. 2. One edge of the sheet from which the tube is formed is preferably turned in toward the axis of the tube and forms a supporting ledge 18 for the reflecting glasses or mirrors that are mounted in the tube and to be hereinafter described. At the outer end of the tube, the same is held against expansion by a cap 19 sleeved onto the said outer end of the tube and having a sight opening 20 axially thereof.

Mounted within the observation tube 16 are the reflecting glasses or mirrors which as here shown are in the form of strips or plates 21 tapering slightly from one end to the other, the plates in actual practice being approximately one inch wide at one end and seven-eighths of an inch at the other end. Of course, the dimensions of these plates both as to length and width will vary according to the size of the observation tube in which they are placed.

The said plates or strips are disposed with respect to each other at an angle of approximately seventy degrees, thus forming two of the three sides of a triangular prism which is incased on all three sides by a wrapper of pliable material 22 as card board or the like. I sometimes employ in addition to the wrapper 22, a base supporting strip 23, which may be of the same or other material as the wrapper. This strip when employed is engaged by the inwardly turned edge 18 of the observation tube 16 as clearly seen in Fig. 3, and serves to wedge the incased reflecting glasses or mirrors in the observation tube.

An object holder is revolubly-mounted in the sides 10 of the frame, and consists of an open-ended transparent cylinder 24, generally made of glass, closed at its ends by means of caps 25. These caps are provided centrally with oblong slots 26 which aline with the circular openings 14 in the sides 10. The object holder is carried by a support 27 freely revoluble in the sides 10 but held against rotation independently of the object holder. This I accomplish by forming the support from a piece of suitable wire which is doubled as clearly shown in Fig. 2 to provide two strands. This support extends axially of the object holder, through the end caps, and through the sides 10, the strands revolving freely in the apertures 14, but held against rotation by reason of the oblong slots 26 in the end caps 25. The free ends of the wire forming the support are bent over as at 28 against the adjacent side 10 and the doubled end of the wire is extended sufficiently far beyond the adjacent side 10 to provide a crank 29 for use in revolving the object holder.

The transparent cylinder 24 constituting the object holder is partially filled, before being placed in position, with vari-colored bodies 30 which are also of various shapes and sizes. In practice, I generally employ small semi-globular candy bodies of all varieties of colors for these objects, as a cheap, durable material for such use is thus provided, and the desired varieties of colors are obtained for producing the different kaleidoscopic effects.

In use, the device is held in one hand so that the object holder may be revolved with the other hand, causing the objects to be tumbled about as the holder is revolved and by reason of their different colors and shapes produce various novel and artistic effects. The adjustment of the observation tube, by rotating same in the frame also provides for an ever changing variety of figures or designs, due to the apicillary line of the mirrors being caused to shift in a circular path so as to depict the objects in a cycle of views or figures. Any desired design may be maintained when the instrument is held so as to keep the objects in motion, to allow for the copying or reproduction of any produced design that it may be desired to preserve. To this end, the instrument aside from its usefulness as a source of instructive entertainment is of service to designers and others desiring novel figures or designs for reproduction.

Having thus described my invention, what I claim as new is:—

1. In a kaleidoscope, revoluble mirrors, and a transparent revoluble object-holder, the axes of rotation of the object-holder being at right angles to the axis of rotation of the mirrors.

2. In a kaleidoscope, an observation tube, and an object holder, said holder being rotatable on its own axis, the axis of rotation extending at substantially right angles to the axis of the tube.

3. An object-holder for kaleidoscopes comprising a transparent open-ended cylinder rotatable on its own axis, end caps for closing the ends of the cylinder, and a support passing through the end caps and cylinder and rotatable with the end caps.

4. In a kaleidoscope, a supporting frame, an observation tube rotatably-mounted in the frame, mirrors carried by said tube and rotatable therewith, and a rotatable object-holder mounted in the frame, the tube and object-holder being rotatable on axes at right angles to each other.

5. In a kaleidoscope, a supporting frame having parallel walls and a connecting wall at right angles to the parallel walls, mirrors revolubly-mounted in the connecting wall, and an object-holder revolubly-mounted in the parallel walls, the axes of the mirrors and the object holder being angular to each other.

6. In a kaleidoscope, a supporting frame having spaced parallel walls and a connecting wall at one end of the parallel walls, mirrors revolubly-mounted in the connecting wall, and a transparent cylindrical object-holder mounted in the parallel walls, the axes of the mirrors and the object holder being angular to each other.

7. In a kaleidoscope, a supporting frame formed of a single piece of material bent to provide parallel spaced walls and a connecting wall, mirrors, and an object-holder, the axes of the object holder substantially intersecting a line extending on the axes of the mirrors.

8. In a kaleidoscope, a supporting frame formed of a single piece of material bent to provide parallel spaced walls and a connecting wall, revoluble mirrors, and a revoluble object-holder, the mirrors being mounted in the connecting wall and the object holder mounted in the spaced walls, the axes of the mirrors and the object holder being angular to each other.

9. In a kaleidoscope, a three-sided supporting frame, mirrors revolubly-mounted in one of said sides, and an object-holder revolubly-mounted in the other two sides of said frame, the axes of the object holder substantially intersecting a line extending on the axes of the mirrors.

In testimony whereof I affix my signature in presence of two witnesses.

TURNEY G. STOUGH.

Witnesses:
E. C. CURRY,
H. V. ROWAN.

Copies of this patent may be obtained for five cents each, by addressing the "Commissioner of Patents, Washington, D. C."